US009422945B2

(12) United States Patent
Baltes et al.

(10) Patent No.: US 9,422,945 B2
(45) Date of Patent: Aug. 23, 2016

(54) PRESSURE ACCUMULATOR

(71) Applicant: Hydac Technology GmbH, Sulzbach/Saar (DE)

(72) Inventors: Herbert Baltes, Losheim (DE); Peter Kloft, Ransbach-Baumbach (DE)

(73) Assignee: HYDAC TECHNOLOGY GMBH, Sulzbach/Saar (DE)

( * ) Notice: Subject to any disclaimer, the term of this patent is extended or adjusted under 35 U.S.C. 154(b) by 0 days.

(21) Appl. No.: 13/261,840

(22) PCT Filed: Oct. 18, 2012

(86) PCT No.: PCT/EP2012/004369

§ 371 (c)(1),
(2) Date: Apr. 10, 2014

(87) PCT Pub. No.: WO2013/056835

PCT Pub. Date: Apr. 25, 2013

(65) Prior Publication Data

US 2014/0311603 A1 Oct. 23, 2014

(30) Foreign Application Priority Data

Oct. 20, 2011 (DE) ........................ 10 2011 116 517

(51) Int. Cl.

| | |
|---|---|
| ***F16L 55/04*** | (2006.01) |
| ***F15B 1/04*** | (2006.01) |
| ***F15B 1/08*** | (2006.01) |
| ***F17C 1/00*** | (2006.01) |

(52) U.S. Cl.

CPC ................ *F15B 1/04* (2013.01); *F15B 1/086* (2013.01); *F17C 1/00* (2013.01)

(58) Field of Classification Search

USPC ........................................................ 138/30

See application file for complete search history.

(56) References Cited

U.S. PATENT DOCUMENTS

| | | | | |
|---|---|---|---|---|
| 2,394,401 | A * | 2/1946 | Overbeke | 138/30 |
| 2,904,077 | A * | 9/1959 | Trumper | 138/30 |
| 3,628,573 | A * | 12/1971 | Loliger et al. | 138/30 |
| 4,121,812 | A * | 10/1978 | Dousset | F16F 13/20 138/45 |
| 4,265,274 | A * | 5/1981 | Zahid | 138/30 |
| 4,367,786 | A * | 1/1983 | Hafner et al. | 165/10 |
| 5,653,263 | A * | 8/1997 | Killing | 138/30 |
| 5,709,248 | A * | 1/1998 | Goloff | 138/30 |
| 6,016,841 | A * | 1/2000 | Larsen | 138/30 |
| 6,076,557 | A * | 6/2000 | Carney | 138/30 |
| 2002/0053364 | A1* | 5/2002 | Kobayashi | F16L 55/053 138/30 |
| 2005/0139277 | A1* | 6/2005 | Baltes | 138/30 |

(Continued)

FOREIGN PATENT DOCUMENTS

| | | |
|---|---|---|
| DE | 967 721 | 12/1957 |
| DE | 12 40 264 B | 5/1967 |
| DE | 695 15 899 T2 | 6/1996 |
| DE | 197 43 007 A1 | 4/1998 |

(Continued)

*Primary Examiner* — James Hook

(74) *Attorney, Agent, or Firm* — Wenderoth, Lind & Ponack, L.L.P.

(57) ABSTRACT

A pressure accumulator has at least one accumulator housing (403) with at least one connection (411) for a pressure medium (421), especially in the form of a fluid that can be accumulated in the accumulator housing (403). The filling material (419) has hollow chambers or forms at least one hollow chamber for accommodating at least part of pressure medium (421) and/or at least one further pressure medium (449) introduced into at least sections of the accumulator housing (403).

16 Claims, 3 Drawing Sheets

(56) References Cited

U.S. PATENT DOCUMENTS

| | | | | |
|---|---|---|---|---|
| 2008/0314467 | A1* | 12/2008 | Gray, Jr. | 138/31 |
| 2009/0126815 | A1* | 5/2009 | Rajabi et al. | 138/31 |
| 2010/0050622 | A1* | 3/2010 | Stroganov | 60/413 |
| 2014/0299609 | A1* | 10/2014 | Baltes | F15B 1/086 220/581 |

FOREIGN PATENT DOCUMENTS

| | | | |
|---|---|---|---|
| DE | 20 2005 002 335 | U1 | 9/2005 |
| DE | 20 2007 008 175 | U1 | 10/2007 |
| DE | 10 2007 016 131 | A1 | 10/2008 |
| DE | 21 2008 000107 | U1 | 12/2010 |
| EP | 0 942 194 | A1 | 9/1999 |

* cited by examiner

PRESSURE ACCUMULATOR

FIELD OF THE INVENTION

The invention relates to a pressure accumulator having at least one accumulator housing with at least one connection for a pressure medium, in particular in the form of a fluid, which can be stored in the accumulator housing. A filling material is introduced at least partially into the accumulator housing. This material has cavities or forms at least one cavity for at least partial accommodation of this pressure medium and/or at least one additional pressure medium.

BACKGROUND OF THE INVENTION

Pressure accumulators are known in various embodiments in the prior art. For example, DE 20 2007 008 175 U1 discloses a hydropneumatic pressure accumulator or hydraulic accumulator having a movable separation element disposed in an accumulator housing. The separation element separates a first working space, preferably a gas space, from a fluid space, as the second working space, and is formed by a diaphragm of a flexible material, in particular an elastomer. At least one housing opening, forming an access to the housing, is provided on the accumulator housing for accommodating and dispensing fluid, in particular in the form of hydraulic fluid.

Pressure accumulators of this type, in particular hydraulic accumulators, are subjected to high demands during operation in hydraulic systems because frequent and intense movements of the elastomeric separation element occur in predefinable operating cycles due to the fluid flowing into and out of the accumulator. This operation causes loading and relaxation separately by the separation element with respect to the gas supply in the accumulator. Overloading and local wrinkling of the material may then occur due to shearing stresses on the separation element and may result in tearing. Tearing would fundamentally make the accumulator useless and would require the hydraulic system to be shut down, at least partially, for replacement purposes. The known pressure accumulators and hydraulic accumulators can be used regularly only as an individual solution for a restricted range of applications in hydraulic systems because of their accumulator capacity and/or their damping characteristics. This restriction leads to a corresponding increase in costs at both the manufacturing end and the consumer end.

DE 197 43 007 A1 describes an accumulator of the pressure accumulator type, having a housing with a connection for a pressure medium in the manner of a hydraulic medium that can be stored in the housing. The housing contains a filling agent in the form of one or more hollow bodies filled with a pressure medium that can be compressed when a higher pressure prevails outside of the filling agent.

DE 695 15 899 T2 relates to an energy accumulator, among other things, formed from a rigid outer casing of two parts clamping a separation diaphragm. A heterogeneous structure for accumulation or dissipation of energy, having a capillary porous solid matrix surrounded by a lyophobic liquid, is provided in a compartment of the energy accumulator bordered by the separation diaphragm. The compartment is isolated from any contact with another hydraulic fluid.

SUMMARY OF THE INVENTION

An object of the invention is to provide improved pressure accumulators, in particular in the form of hydraulic accumulators, while retaining the prior art advantages, namely to ensure a high accumulator capacity, to have a longer lifetime and to be adapted well to given application fields, based on their damping characteristics and/or accumulator capacity, accordingly, so that various applications are possible with only a few accumulator concepts to reduce costs.

According to the invention, this object is basically achieved by a pressure accumulator having at least one elastomeric separation element, preferably in the form of a separation diaphragm or a separation bladder, subdividing the accumulator housing into at least two working spaces. One working space accommodates the one pressure medium in the form of a liquid. The other working space accommodates the other pressure medium in the form of a working gas, such as nitrogen gas. The filling material is bordered or enclosed at least partially by the separation element.

A filling material having cavities and/or forming at least one cavity for at least partial accommodation of this pressure medium and/or at least one additional pressure medium is thus introduced at least partially into the accumulator housing.

The particular advantage of the pressure accumulator according to the invention is that, on flowing into the accumulator housing through the assignable housing opening, the pressure medium, that is to be controlled by the accumulator and that is usually in the form of hydraulic fluid or a working gas in a pneumatic application, encounters the filling material that has been introduced into the accumulator housing. Meanwhile, the accumulator housing is filled at least partially with the filling material, so the accumulator capacity of the accumulator for the respective application case can be adjusted in the case of a hydraulic or pneumatic system. Depending on the degree of filling with the filling material, one and the same accumulator, depending on its fundamental accumulator design, can be adapted for a variety of application cases in the aforementioned technical systems. Standardized accumulators can thus be mass produced and filled with different amounts of filling material. This ability leads to low manufacturing costs because of the benefits of mass production. For the first time, a delivered accumulator can be replaced with another accumulator filled to a different extent with filling material, so that the accumulator can be adapted to modified specifications of the system even on site, i.e. at the user's end, permitting cost reductions for the user's end to this extent.

To be able to adjust the accumulator capacity in the accumulator housing accordingly, the filling material may be introduced as a solid block into the accumulator with a predefinable volume, in particular introducing it by molding or injection molding. The filling material then leaves free a cavity, at least within the accumulator housing, which cavity defines the accumulator capacity of the accumulator and can be filled with the respective working medium (fluid and/or gas). Especially preferably, that filling material can be provided in the form of a cellular structure introduced into the respective accumulator housing of the pressure accumulator or hydraulic accumulator, wherein the filling material is designed to have cavities, possibly with closed pores, but preferably with open pores in its interior. The individual cavities then communicate primarily with one another through permeable fluid channels accordingly. The more the cavities are then integrated into the filling material and are formed by the filling material itself, the greater the increase in accumulator capacity of the accumulator modified in this way.

The two types of cavity design described above can also be combined with one another.

The cavity volume or hollow compartment volume, which is adjustable and introduced into the accumulator through the filling material, is also suitable for damping the respective medium penetrating accordingly. The damping characteristic of the accumulator can then be adjusted to this extent. In particular, the stiffness of the damping can be influenced in this way. A further adaptation to predefinable damping characteristics can be achieved if the filling material is designed to be at least partially flexible. A type of spring constant can then be stipulated as a damping constant at the manufacturing end for the respective pressure accumulator in a manner comparable to that with a compression spring.

In a particularly preferred embodiment, if the approach using the filling material according to the invention is used not only for conventional pressure accumulators in the form of gas bottles or other fluid storage bottles for conventional pressure accumulators, but instead is also used for hydraulic accumulators having a movable separation element arrangement, preferably formed from an elastomeric separation material, then the filling material or filling agent introduced into the pressure accumulator may serve to support the separation element, usually in the form of a separation bladder or in the form of a separation diaphragm in its movement. Because of the aforementioned, preferably elastic support by the filling material, overstressing in the separation element material is prevented, as are the negative effects of wrinkling, leading to designs with separation elements having a long service life, which in turn help to significantly increase the useful life or lifetime of the accumulator. Due to the delayed or limited admission of the pressure medium into the respective pressure accumulator, a homogeneous temperature profile can be developed inside the accumulator, which in turn protects the working medium, usually in the form of a hydraulic fluid or a pneumatic medium.

The filling material, with its cavities, is preferably formed from a sintered material and/or a cellular material such as foam, a gel or a woven or nonwoven textile or a comparable textile material. If the filling material inside the pressure accumulator does not need to be elastically flexible, for example, in the implementation of the pressure accumulator as a simple gas or other fluid storage bottle, the filling material may also be made of a sintered ceramic or metallic material or a gelatinous substance, which in a special embodiment can also allow input of the medium to be introduced into the accumulator in the form of a bubble feed. The cavities are created with the bubble feed. The gel more or less only on the introduction of medium into the accumulator. With a corresponding reduction in the working pressure on the input side of the accumulator, the bubble feed is then released again within the gelatinous substance, and the medium that is introduced can be returned to the hydraulic or pneumatic working cycle.

However, with the pronounced elastic characteristic of the filling material, advantageously the filling material is formed from an open-pore foam, preferably a polyurethane foam. If a textile material is used as the filling material, the textile material, in the form of a supporting structure or a supporting fabric, may serve as a backing for foam components, such as the aforementioned polyurethane foam, for example. On the whole, the filling agent or filling material can basically be used for such structures or substrates that have a high accumulator capacity accordingly, preferably having a sufficient elastic flexibility, and can be introduced well into the internal structure of the accumulator in a permanent and thermally stable form.

In a preferred embodiment of the approach using the pressure accumulator according to the invention, the density of the filling material inside the pressure accumulator can be varied, in particular having a cluster or sandwich-type structure. The respective change in density can preferably be provided in at least one direction of orientation, for example, in the direction of the longitudinal axis of the pressure accumulator. If the filling material is in the form of a foam, then the differences in density can be created by repeated injection or foaming. For example, a gradient-type design of the foam material would then be possible, such that a very dense material is used on the input end of the accumulator. Then, with open pores or with a lower density, the density changes rapidly in the direction of the opposite end of the accumulator housing. Instead of the pressure medium entering into the accumulator housing body, an increased resistance can then be built up in that the barrier property of the foam or some other filling material is increased accordingly. To ensure different densities and cavity structures, different filling materials can be used in some sections in the sense outlined above.

Advantageously, in particular, when the one working space can contain the pressure medium in the form of a fluid together with the filling material. Much higher pressure energies can be stored in the pressure accumulator with this configuration, if necessary.

More preferably, the separation element has the filling material on one of its two sides, preferably on the side adjacent to a pressure medium, preferably in the form of a liquid. The filling material is then at least partially in direct contact with the side of the separation element in that regard. Such contact provides a favorable influence on the deformation of the separation element, so that the deformation can be shifted into those regions, resulting in a longer lifetime of the separation element. Another possibility is using a corresponding filling material on both sides of the respective separation element, so that the accumulator values and the damping values on the gas side of the accumulator can be influenced. Depending on the design of the accumulator, however, other media can also be separated from one another by the respective separation element, for example, separating gas from gas or liquid from liquid. Furthermore, pasty or gelatinous media can also be stored there, depending on the accumulator capacity, and then retrieved from the accumulator cyclically.

The accumulator housing may be in multiple parts, in particular two parts. The accumulator housing parts that are joined together may secure the separation element in the accumulator housing. One accumulator housing part preferably has at least one connection for the one pressure medium, preferably in the form of a liquid. This arrangement has proven to be especially advantageous to manufacture. The accumulator housing parts may be manufactured as cast parts or as laminates. The separation element may then be disposed between the accumulator housing parts and secured there especially advantageously in welding the accumulator housing parts. By an additional connection in the accumulator housing, preferably disposed on the side opposite the first connection, the additional pressure element, preferably in the form of a working gas, may be checked, refilled and placed as needed.

In a further embodiment, the accumulator housing parts can be connected to one another by way of a threaded connection, preferably using a union nut. Meanwhile, the accumulator housing may be opened for inspection and repair purposes.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings that form a part of this disclosure and that are schematic and not to scale.

DETAILED DESCRIPTION OF THE INVENTION

Figure 1:
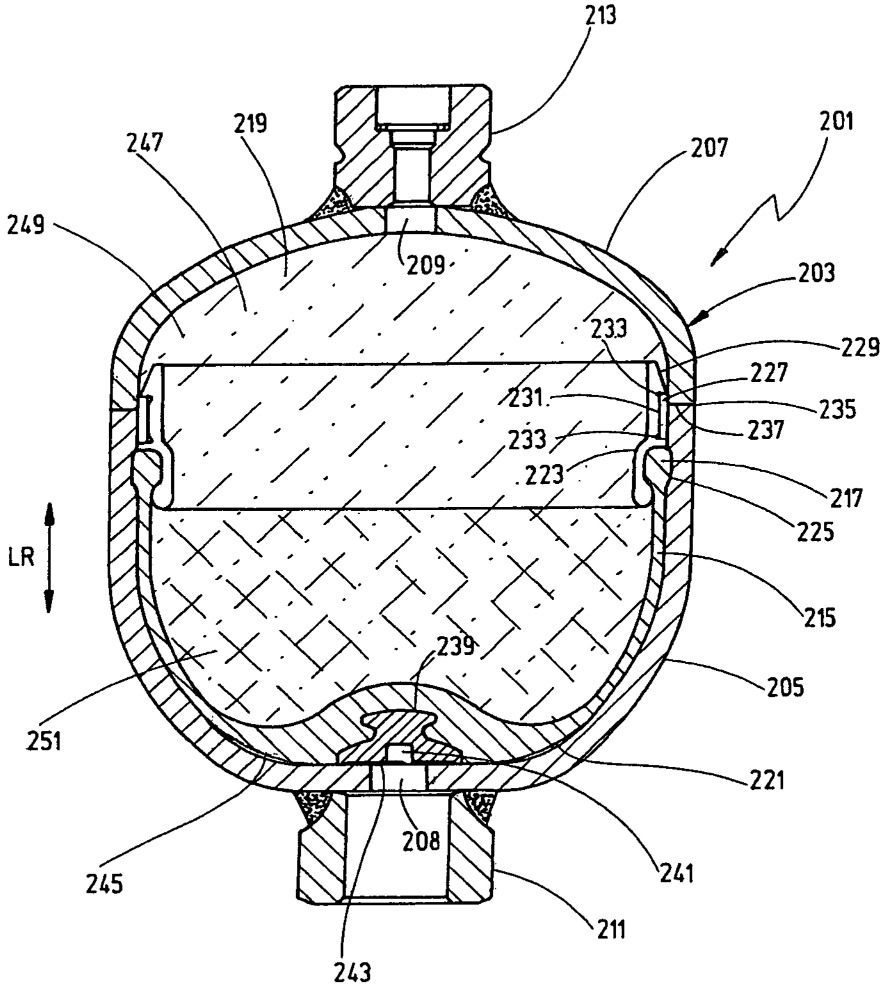
FIG. 1 is a side view in section of a diaphragm accumulator according to a first exemplary embodiment of the invention.

FIG. 1 shows a diaphragm accumulator 201. The diaphragm accumulator 201 has an accumulator housing 203 having two rotationally symmetrical accumulator housing parts 205, 207 made of a metallic material. Openings 208, 209, to which connections 211, 213 are welded, are provided in the accumulator housing parts 205, 207. The connection 213, at the top in the plane of the figure, is closed during operation by a removable stopper (not shown) or a screw. A dividing element 215 in the form of a dividing diaphragm made of an elastomer is disposed in the accumulator 203. The separation diaphragm 215 has a peripheral edge bead 217 on its one end. The edge bead 217 of the separation diaphragm 215 is held in a form-fitting manner by a retaining ring 223 and a peripheral groove 225 in the lower accumulator housing part 205. The retaining ring 223 is surrounded by a metal ring 227. At the upper end of the retaining ring 223, a beveled face 229 is formed. Furthermore, the metal ring 227 is inserted into a peripheral groove 231 having recessed outlets 233 at the edge. The metal ring 227 is disposed in the region 235 of the neighboring contact faces 237 of the accumulator housing parts 205, 207 and protects the sensitive dividing diaphragm 215 and the retaining ring 223 from thermal damage and/or welding splashes when welding the accumulator housing parts 205, 207 to one another. A piston-shaped valve body 239 having a central recess 241 on the bottom side 243 is provided in the separation diaphragm 215. In the unloaded state of the diaphragm accumulator 201 illustrated, this valve body comes to rest against the fluid-side opening 208 of the lower accumulator housing part 205 to form a seal.

A lower first working space 245, at the bottom in the plane of the figure, for a first pressure medium 221, in particular a fluid such as a hydraulic fluid, is formed by the separation element 215. Above that, a second working space 247 is provided and is filled with another pressure medium 249, in particular a gas such as nitrogen ($N_2$), for example. In addition, an elastically compressible filling material 219, in particular an open-pore polyurethane film, is in the second working space 249. The filling material 219 supports the separation diaphragm 215 in its movement over the full surface, thereby preventing overloading or wrinkling of the separation diaphragm 215, which overloading or wrinkling could otherwise shorten the lifetime of the separation diaphragm 215.

The cavities and the foam filling material 219 are essentially interconnected, so that the additional pressure medium 249 can diffuse into the filling material 219. The density of the filling material 219 determines how much of the additional pressure medium 249 can be accommodated in the second working space 247. The damping characteristic of the diaphragm accumulator 201 is also partially determined by the compression characteristics of the filling material 219. The damping becomes greater as the rigidity of the filling material 219 is greater.

The varying density profile of the filling material 219 is suggested by the different dashes in some sections. In the lower region 251, the density is higher accordingly to additionally support the separation diaphragm 215.

In a preferred embodiment of the hydraulic diaphragm accumulator (not shown here), the foam-type filling material may also be filled into individual sandwich-type layers. The density profile, and thus the damping properties, of the foam can be adjusted accurately in this way, in particular in the longitudinal direction LR of the accumulator. Furthermore, a homogeneous temperature profile is also achieved within the accumulator during operation, which profile protects the media introduced into the accumulator.

Figure 2:
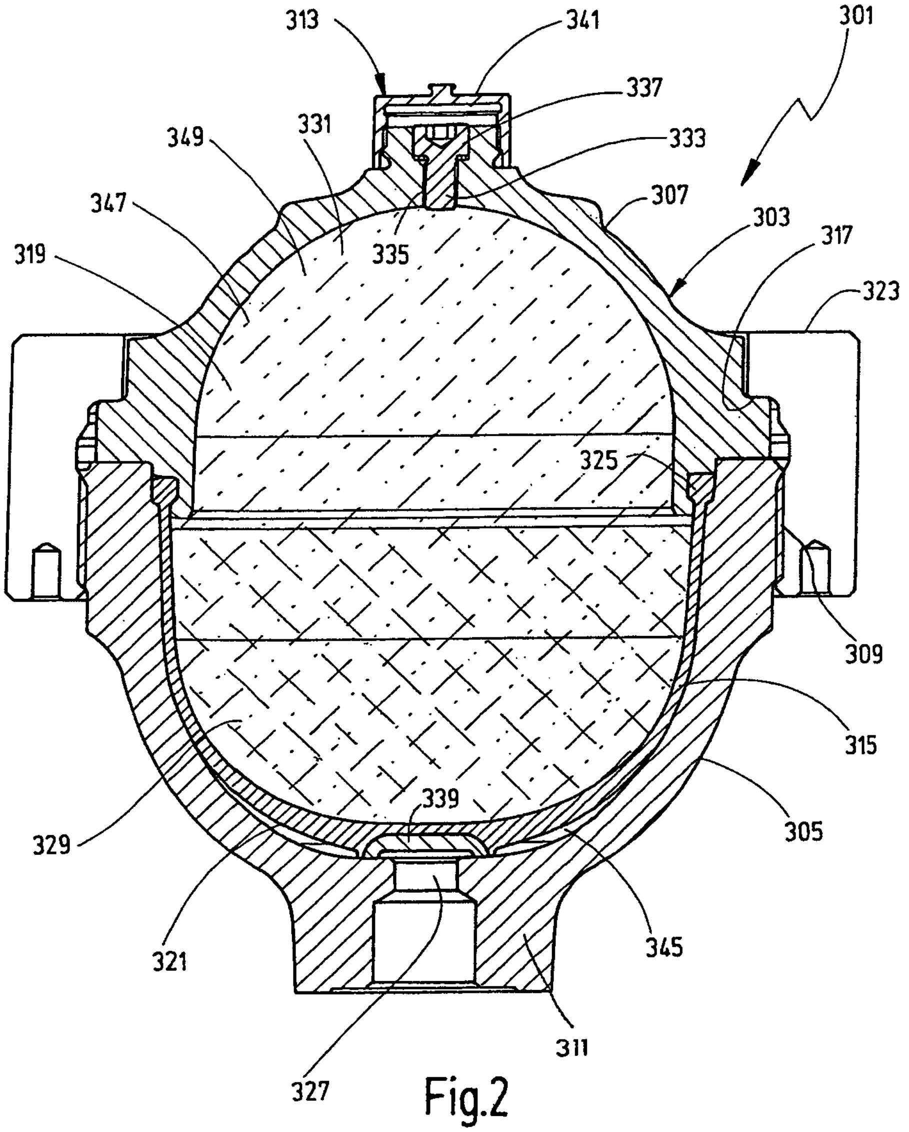
FIG. 2 is a side view in section of a diaphragm accumulator according to a second exemplary embodiment of the invention.

FIG. 2 shows another diaphragm accumulator 301. This diaphragm accumulator 301 has an accumulator housing 303 with two accumulator housing parts 305, 307 made of the metallic materials that are generally used for this purpose. However, one or both of the accumulator housing parts 305, 307 can be manufactured from a plastic laminate. The accumulator housing parts 305, 307 can be joined by a threaded connection 309. To do so, a shoulder 317 is provided on the upper accumulator housing part 307 with a type of clamp ring 323 serving as a union nut being placed on this shoulder. Between a peripheral edge bead 325 of a separation element 315, a separation diaphragm, made of an elastomer here, is held in a form-fitting manner between the accumulator housing parts 305, 307. A valve plate 339 is provided on the separation diaphragm 315. In the unactuated state of the diaphragm accumulator 301 shown here, this valve plate covers an opening 327 in the accumulator housing part 305 at the bottom of the plane of the figure.

A first working space 345 for a first pressure medium 321 in the form of a fluid is formed by the separation diaphragm 315 in the lower accumulator housing part 305. On the opposite side of the separation diaphragm 315, a second working space 347 is filled with a second pressure medium 349 in the form of nitrogen and a filling material 319. The filling material 319 fills the second working space uniformly in the drawing. The filling material 319 in the present case has two elastically compressible foam parts 329, 331 designed in the form of blocks. The lower foam part 329 has a higher density and thus has a greater damping effect. Due to the fact that the lower foam part 329 is in contact with the separation diaphragm 315, the separation diaphragm 315 is supported in movement and the overstressing or wrinkling that shortens the lifetime is again prevented. The filling material 319 helps to ensure a more homogeneous temperature profile in the diaphragm accumulator 301 during operation. The first pressure medium 321 flowing into the first working space 347 is also protected in this way. An opening 333 in the upper accumulator housing part 307 is provided with an internal thread 335, into which a replacement screw 337 is screwed. This thread and screw form a connection 313 covered on the outside by a screwed-on cap 341.

Figure 3:
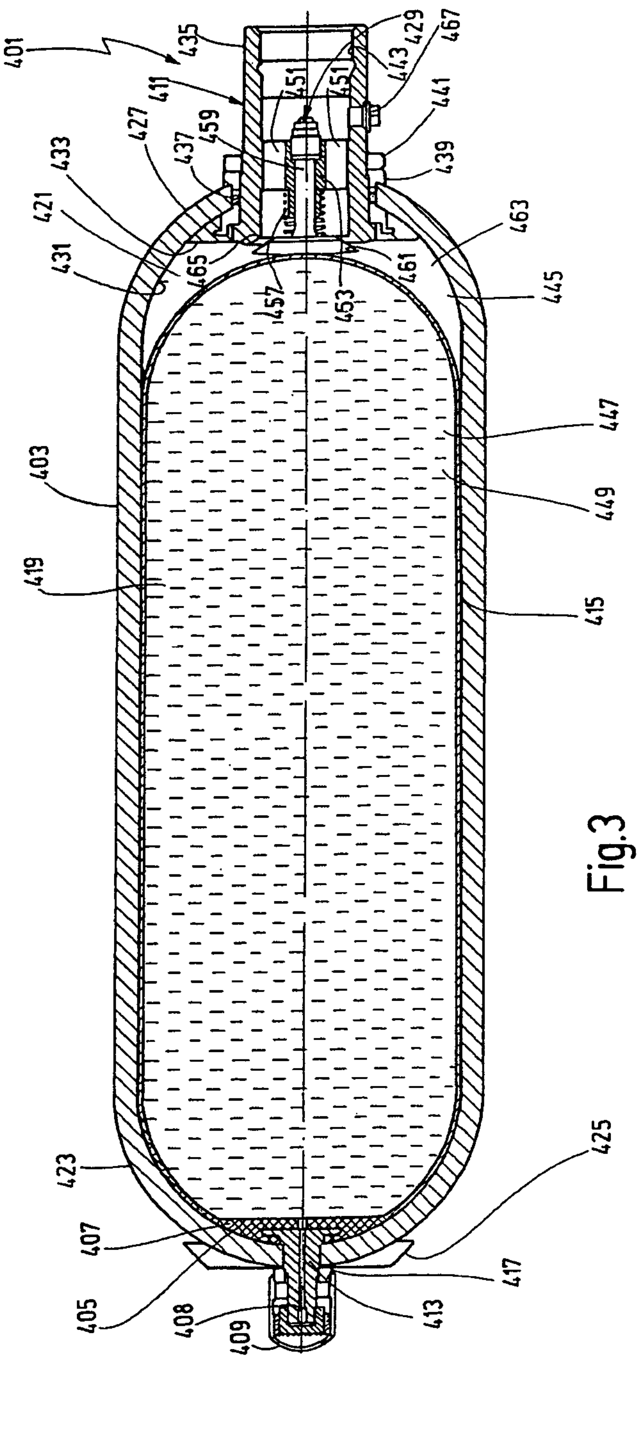
FIG. 3 is a side view in section of a bladder accumulator according to a third exemplary embodiment of the invention.

FIG. 3 shows a bladder accumulator 401 as an additional approach to a hydraulic accumulator with a separation element. A separation element 415 in the form of an elastomeric separation bladder is disposed in a one-piece bottle-shaped accumulator housing 403, which housing may also be made of a plastic laminate. The separation bladder 415 in the unactuated state is in the form of a rotational body having a uniform shape. The separation bladder 415 has a reinforcement 407 on one end 405 with a connection 413 incorporated into it and protruding out of the accumulator housing 403, where it is sealed with respect to the outside by a closing stopper 408. A cap 409 is placed on or screwed onto the connection 413. The connection 413 is secured accordingly with a nut 417 on the outside 423 of the accumulator housing 403. In addition, a plate 425 is secured with the nut 417 on the accumulator, which plate may have an inscription identifying the accumulator and/or manufacturer's information, for example.

A connection 411 with a valve 429 is provided at the other end 427 of the accumulator housing 403. In addition, an accommodating part 433 is disposed on the inside 431 of the accumulator housing 403, centering the part of the connection 411 that protrudes into the accumulator housing 403 and securing it accordingly. The outside wall 435 of the connection 411 is sealed by an O-ring gasket 437 with respect to the accumulator housing 403. The connection 411 is secured on the outside 423 of the accumulator housing 403 by a centering ring 439 and a nut 441. Supports 451 extending transversely are arranged in diametric opposition to one another, relative to the longitudinal axis of the accumulator in the interior 443 of the connection 411, permanently limiting the fluid passage within the connection 411 and accommodating a bushing 453. A rod-type valve body 459, acted upon by a spring 457, is guided through this bushing 453. A valve disk 461 of the valve body 459 protrudes into the interior 463 of the accumulator housing 403, so that the separation bladder 415 acts on the valve disk 461. At maximum extension of bladder 415, valve disk 461 comes into sealing contact with a valve seat 465 of the connection 411 against the action of the compression spring or return spring 457. Furthermore, a screw 467 is provided in the outside wall 435 of the connection 411, such that when the screw is removed, a corresponding fluid sensor (not shown) can be screwed into that connection 411.

The accumulator housing 405 is again divided by the separation bladder 415 into a first working space 445 for a first pressure medium 421, in particular a fluid, and a second working space 447 situated in the separation bladder 415 for a second pressure medium 449 in the form of nitrogen. The separation bladder 415 is filled by a filling material 419. The filling material 419 is a thermally stable, elastically compressible low-density foam. A plurality of cavities with open pores is provided in the filling material 419. The filling material 419 is in full surface contact with separation bladder 415. The separation bladder 415 is supported in its movement in this way. Overloading of sections of the separation bladder 415 is prevented, along with wrinkling and its negative effects. In addition, the first working space 445 may be formed with an additional filling material, preferably in the form of a fluid-resistant foam, so that the diaphragm 415 can be supported in its movement in two opposite directions of movement during operation of the accumulator.

Meanwhile, the separation bladder 415 has a much longer lifetime than conventional approaches. On the whole, the bladder accumulator 401 according to the invention is therefore characterized by a longer lifetime, a greater accumulator capacity for compression energy and a better damping characteristic.

While various embodiments have been chosen to illustrate the invention, it will be understood by those skilled in the art that various changes and modifications can be made therein without departing from the scope of the invention as defined in the claims.

The invention claimed is:

1. A pressure accumulator, comprising:

at least one accumulator housing having first and second connections for first and second pressure mediums, respectively, stored in said accumulator housing;

a filling material at least partially introduced into said accumulator housing, said filling material having cavities at least partially accommodating at least one of the pressure mediums, said filling material including different sections having different materials with different densities and cavity structures therein, each of said different materials having said cavities therein; and at least one elastomeric separation diaphragm subdividing an interior of said accumulator housing into at least first and second working spaces, said first working space accommodating first pressure medium, said second working space accommodating the second pressure medium, said separation diaphragm at least partially enclosing said filling material in at least one of said working spaces.

2. A pressure accumulator according to claim 1 wherein said first pressure medium is a liquid; and said second pressure medium is a working gas.

3. A pressure accumulator according to claim 2 wherein said gas working comprises nitrogen gas.

4. A pressure accumulator according to claim 2 wherein said filling material is in said second working space and is at least partially in direct contact with a side of said separation diaphragm.

5. A pressure accumulator according to claim 2 wherein said accumulator housing comprises at least first and second housing parts joined together to secure said separating diaphragm therebetween, said first housing part having a said second connection to said second working space.

6. A pressure accumulator according to claim 5 wherein said housing parts are connected to one another by a threaded connection.

7. A pressure accumulator according to claim 6 wherein said threaded connection comprises a union nut part.

8. A pressure accumulator according to claim 1 wherein said filling material comprises a cellular foam material.

9. A pressure accumulator according to claim 1 wherein said filling material is elastically compressible.

10. A pressure accumulator according to claim 1 wherein said densities vary in a cluster design.

11. A pressure accumulator according to claim 1 wherein said densities vary in a sandwich design.

12. A pressure accumulator, comprising:

at least one accumulator housing having first and second connections for first and second pressure mediums, respectively, stored in said accumulator housing;

at least one elastomeric separation diaphragm subdividing an interior of said accumulator housing into at least first and second working spaces, said first working space accommodating the first pressure medium, said second working space accommodating second pressure medium; and filling material introduced in said accumulator housing in both of said first and second working spaces, said filling material having different materials with different densities and cavity structures therein, each of said different materials having cavities therein.

13. A pressure medium according to claim 12 wherein said first pressure medium is a liquid; and said second pressure medium is a working gas.

14. A pressure accumulator, comprising:

at least one accumulator housing having first and second connections for first and second pressure mediums, respectively, stored in said accumulator housing;

a filling material at least partially introduced into said accumulator housing, said filling material having cavities at least partially accommodating at least one of the pressure mediums, said filling material including different materials with different densities and different cavity structures therein, each of said different materials having cavities therein; and at least one elastomeric separation diaphragm subdividing an interior of said accumulator housing into at least first and second working spaces, said first working space accommodating first pressure medium, said second working space accommodating the second pressure medium, said separation diaphragm at least partially enclosing said filling material in at least one of said working spaces.

15. A pressure accumulator according to claim 14 wherein said first pressure medium is a liquid;

said second pressure medium is a working gas; and the filling material is in said second working space.

16. A pressure accumulator according to claim 14 wherein said first pressure medium is a liquid;

said second pressure medium is a working gas; and the filling material is in the first and second working spaces.

* * * * *